(12) United States Patent
Hayama

(10) Patent No.: US 8,386,673 B2
(45) Date of Patent: Feb. 26, 2013

(54) KVM SWITCH AND METHOD FOR CONTROLLING THE SAME

(75) Inventor: Masanobu Hayama, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 448 days.

(21) Appl. No.: 12/230,698

(22) Filed: Sep. 3, 2008

(65) Prior Publication Data

US 2009/0063732 A1   Mar. 5, 2009

(30) Foreign Application Priority Data

Sep. 4, 2007   (JP) ................................. 2007-229586

(51) Int. Cl.
*G06F 13/12*   (2006.01)
*G06F 13/38*   (2006.01)

(52) U.S. Cl. ........................................................ 710/62

(58) Field of Classification Search ...................... 710/62
See application file for complete search history.

(56) References Cited

U.S. PATENT DOCUMENTS

| 5,721,842 | A | 2/1998 | Beasley et al. |
| 7,161,557 | B2 * | 1/2007 | Thornton ........................ 345/2.1 |
| 2006/0123182 | A1 * | 6/2006 | Sandulescu et al. .......... 710/316 |
| 2006/0176293 | A1 | 8/2006 | Hoshino |

FOREIGN PATENT DOCUMENTS

| JP | 2001-67289 | 3/2001 |
| JP | 2003-308063 | 10/2003 |
| JP | 2005-18135 | 1/2005 |
| JP | 2005-501352 | 1/2005 |
| JP | 2005-509947 | 4/2005 |
| JP | 2005-251155 | 9/2005 |
| JP | 2006-221292 | 8/2006 |
| JP | 2007-74682 | 3/2007 |
| WO | WO 03/019760 | 3/2003 |
| WO | 03/04244 A1 | 5/2003 |

OTHER PUBLICATIONS

Japanese Office Action for Application No. 2007-229586 issue Jun. 12, 2012.

* cited by examiner

*Primary Examiner* — Chun-Kuan Lee
(74) *Attorney, Agent, or Firm* — Staas & Halsey LLP

(57) ABSTRACT

A KVM switch connected between a plurality of consoles including a plurality of monitors, and a plurality of information processing apparatuses, comprises a setting portion that sets a part or all of the plurality of consoles to each information processing apparatus as one group, wherein the plurality of monitors included in the plurality of consoles which are set as one group by the setting portion display information from an information processing apparatus corresponding to the group.

17 Claims, 14 Drawing Sheets

FIG. 4

| LOG-IN ID | PASSWORD |
|---|---|
| KU001 | zxc001 |
| KU002 | was027 |
| KU003 | qse130 |
| ⋮ | ⋮ |
| KU100 | ged628 |

FIG. 10

| GROUP SETTING |  |
|---|---|
| NUMBER OF GROUP | 2 |

FIG. 11

| SERVER SELECTION |||||
|---|---|---|---|---|
| MASTER |||||
| ● SERVER101 |||||
| SERVER102 |||||
| SERVER103 |||||
| ⋮ |||||
| SERVER108 |||||
| 「↑」、「↓」<br>「ENT」<br>「L」 | :SELECT<br>:SET<br>:LOGOUT | | 「ESC」<br>「M」 | :CLOSE<br>:MENU |

US 8,386,673 B2

KVM SWITCH AND METHOD FOR CONTROLLING THE SAME

BACKGROUND OF THE INVENTION

1. Field of the Invention

The present invention relates to a KVM switch which is connected between a plurality of consoles and a plurality of computers, as well as a method for controlling the same.

2. Description of the Related Art

Conventionally, there has been known a system console apparatus having a data input and output controller 2 connected to four computers 1A, 1B, 1C, and 1D, and a display terminal device 3 executing the input and output of data through the data input and output controller 2 with each computer 1A, 1B, 1C, and 1D. In this case, the format of a display screen is designated by a screen display changeover switch 4 so that the display screen to be displayed on the display terminal device 3 can be switched (see Japanese Laid-Open Patent Publication No. 2001-67289).

Further, conventionally, there has been known a computer-switching apparatus which executes multicast of the operation information of a keyboard and a mouse to any number of computers in a plurality of computers connected to the computer-switching apparatus, and displays the VGA output of the any number of computers on a single display (see Japanese Laid-Open Patent Publication No. 2006-221292).

Conventionally, there has been known a KVM (K: keyboard, V: video, M: mouse) switch which switches any one of a plurality of consoles to another console, and connects the another console to any one of a plurality of computers (see Japanese Laid-Open Patent Publication No. 2005-509947). In this case, each console is comprised of a keyboard and a mouse.

Further, conventionally, there has been known a KVM switch which includes a console port, a plurality of slots that are attachable modules having a plurality of ports for connecting computers, and a front panel that selectively switches the connection between a port to which the computers is connected and a peripheral device (see Japanese Laid-Open Patent Publication No. 2005-18135).

As described above, the techniques of Japanese Laid-Open Patent Publication Nos. 2001-67289 and 2006-221292 display the output of the plurality of computers on a single display. The technique of Japanese Laid-Open Patent Publication No. 2005-509947 switches the console used for each computer to another console. The technique of Japanese Laid-Open Patent Publication No. 2005-18135 selectively switches a computer used with a set of console from the plurality of computers.

However, in the KVM switches of Japanese Laid-Open Patent Publication Nos. 2001-67289, 2006-221292, 2005-509947, and 2005-18135, the monitor for which each computer can be used is only one, and cannot adapt to a multi-monitor environment, the use of which has begun to spread in recent years.

SUMMARY OF THE INVENTION

It is an object of the present invention to provide a KVM switch and a method for controlling the same which are adaptable to a multi-monitor environment.

According to a first aspect of the present invention, there is provided a KVM switch connected between a plurality of consoles including a plurality of monitors, and a plurality of information processing apparatuses, comprising: a setting portion that sets a part or all of the plurality of consoles to each information processing apparatus as one group; wherein the plurality of monitors included in the plurality of consoles which are set as one group by the setting portion display information from an information processing apparatus corresponding to the group.

According to a second aspect of the present invention, there is provided a method for controlling a KVM switch connected between a plurality of consoles including a plurality of monitors, and a plurality of information processing apparatuses, comprising: a setting step that sets a part or all of the plurality of consoles to each information processing apparatus as one group; wherein the plurality of monitors included in the plurality of consoles which are set as one group in the setting step display information from an information processing apparatus corresponding to the group.

BRIEF DESCRIPTION OF THE DRAWINGS

Preferred embodiments of the present invention will be described in detail with reference to the following drawings, wherein:

FIG. 4 is a block diagram showing an example of table data which provides for a relationship between a log-in ID and a password;

FIG. 10 is a diagram showing an example of a group setting screen;

FIG. 11 is a diagram showing an example of a server selection screen;

DESCRIPTION OF THE PREFERRED EMBODIMENTS

A description will now be given, with reference to the accompanying drawings, of an embodiment of the present invention.

Figure 1:
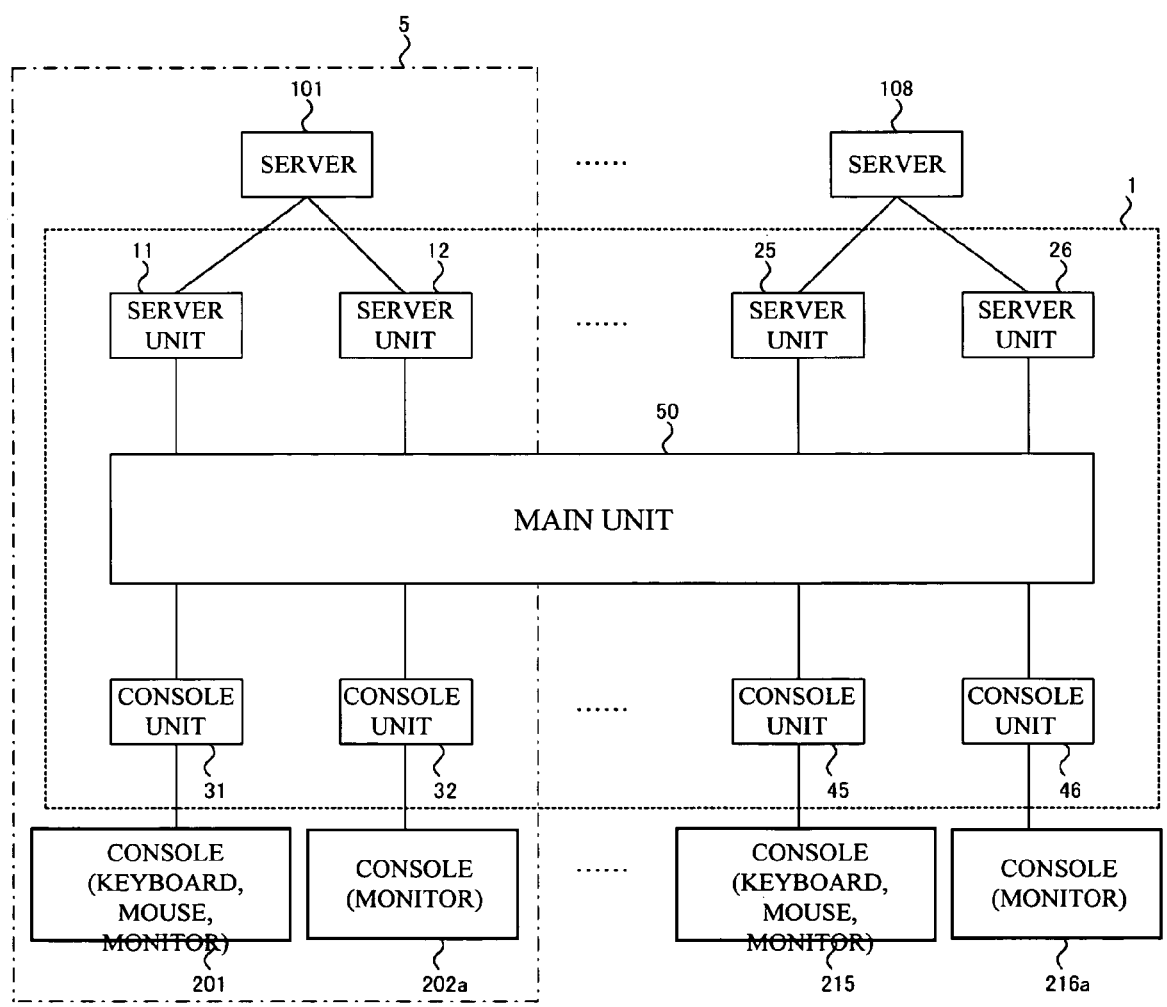
FIG. 1 is a block diagram showing the construction of an information processing system having a multi-user KVM switch which has realized a multi-monitor environment.

FIG. 1 is a block diagram showing the construction of an information processing system having a multi-user KVM switch which has realized a multi-monitor environment.

The information processing system in FIG. 1 includes servers 101 to 108, a multi-user KVM switch 1, and consoles 201 to 216. Each of the consoles 201, 203, 205, 207, 209, 211, 213, and 215 is provided with a monitor, a keyboard, and a mouse. Each of the consoles 202, 204, 206, 208, 210, 212, 214, and 216 is provided with a monitor. In the following description, the monitor is shown by attaching a mark "a" to a reference numeral of a corresponding console, and the keyboard and mouse are shown by attaching a mark "b" to a reference numeral.

The multi-user KVM switch 1 includes server units 11 to 26, a main unit 50, and console units 31 to 46. Cables with a longest length of about 100 meter are connected between the server units 11 to 26 and the main unit 50, and cables with a longest length of about 300 meter are connected between the console units 31 to 46 and the main unit 50.

The server 101 is connected to the main unit 50 via the server units 11 and 12. The console unit 201 is connected to the main unit 50 via the console unit 31. A monitor 202a is connected to the main unit 50 via the console unit 32.

The other servers are also connected to the main unit 50 via two server units. One console includes the monitor, the keyboard, and the mouse, and the other console includes only the monitor.

In this case, an RGB signal output from a single server is displayed on two monitors included in the respective two consoles. Therefore, compared with the case of one monitor, the area of the monitor that displays the RGB signal output from each server doubles.

To realize the multi-monitor environment, a user causes any monitor to display a group setting screen of an OSD function described later, and has to do a given setting, for example. In FIG. 1, the construction in a dashed line 5 is set to one group.

Although in the present embodiment, the multi-user KVM switch 1 is separated to the server units 11 to 26, the main unit 50, and the console units 31 to 46, any one of the console units 11 to 26 or the server units 31 to 46, or both of them may be integrated with the main unit 50.

Figure 2:
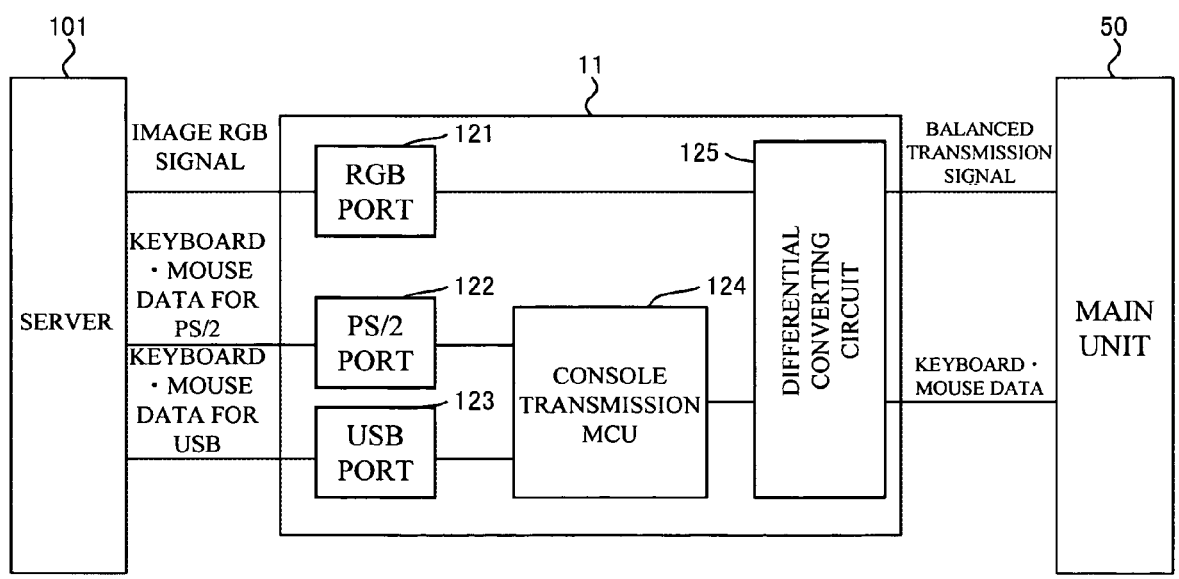
FIG. 2 is a block diagram showing the construction of a server unit 11.

FIG. 2 is a block diagram showing the construction of the server unit 11.

The server unit 11 includes an RGB port 121, a PS/2 port 122, a USB (Universal Serial Bus) port 123, a console transmission MCU (Micro Controller Unit) 124, and a differential converting circuit 125.

The RGB port 121 is connected to the server 101, receives the RGB signal from the server 101, and outputs the RGB signal to the differential converting circuit 125. The differential converting circuit 125 converts the RGB signal into a balanced transmission signal, and outputs the balanced transmission signal to the main unit 50. Moreover, the differential converting circuit 125 receives operation data of the keyboard and the mouse from the main unit 50, converts the operation data into operation data for the PS/2 port 122 or the USB port 123, and outputs the converted operation data to the console transmission MCU 124.

The console transmission MCU 124 outputs the operation data for the PS/2 port 122 or the USB port 123 to the server 101 via the PS/2 port 122 or the USB port 123. The server unit 11 further may include a COM port (communication port) for connecting external equipment thereto. In addition, the USB port 123 can connect to USB equipment other than the server. It should be noted that the construction of the other server units is the same as that of the server unit 11, and hence description thereof is omitted.

Figure 3:
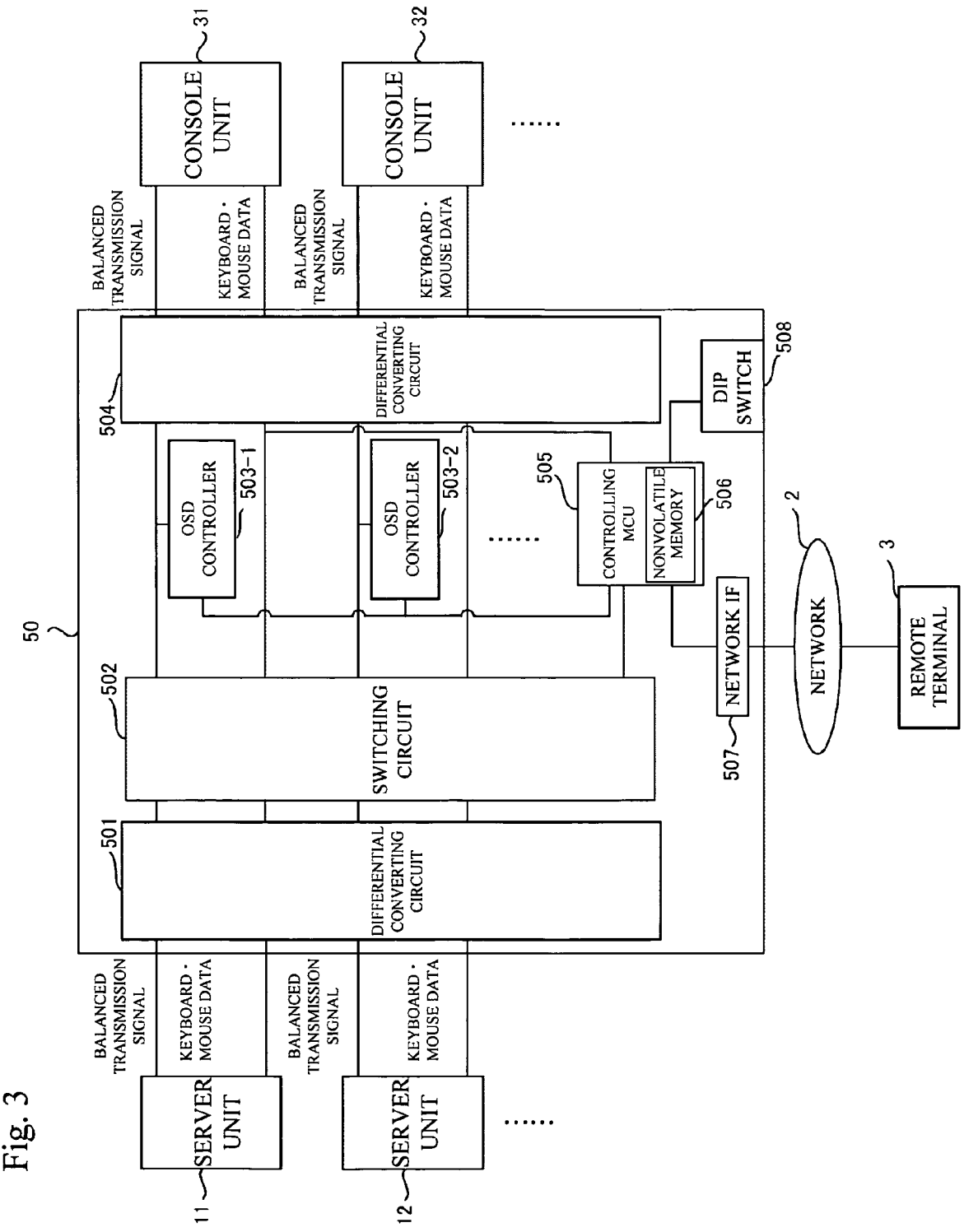
FIG. 3 is a block diagram showing the construction of a main unit 50.

FIG. 3 is a block diagram showing the construction of the main unit 50.

The main unit 50 includes differential converting circuits 501 and 504, a switching circuit 502 (a switching portion), OSD controllers 503-N (N=1, 2, ... ), a controlling MCU 505 (a setting portion, a deciding portion, a controlling portion) including a nonvolatile memory 506, a network interface (I/F) 507 (a communicating portion), and a dip switch 508 (an operating element).

The differential converting circuit 501 converts the balanced transmission signal from each server unit into the RGB signal, outputs the converted RGB signal to the switching circuit 502, and converts the operation data of the keyboard and the mouse into data of a given form.

The switching circuit 502 switches the destination of output of the converted RGB signal and the operation data according to a controlling command of the controlling MCU 505.

The OSD controllers 503-N receive data of a setting screen of the OSD (On Screen Display) function stored into the nonvolatile memory 506 from the controlling MCU 505, and output the data to each console unit via the differential converting circuit 504.

The differential converting circuit 504 converts the RGB signal into the balanced transmission signal, and outputs the balanced transmission signal to each console unit. The differential converting circuit 504 converts the operation data into given operation data, and outputs the given operation data to the switching circuit 502.

The controlling MCU 505 controls the action of the switching circuit 502 and the OSD controllers 503-N. The controlling MCU 505 receives a setting command to set the plurality of consoles and server units as one group from each console, the network IF 507, or the dip switch 508. When the controlling MCU 505 receives the setting command, the controlling MCU 505 transmits data corresponding to the setting command stored into the nonvolatile memory 506 to the corresponding OSD controller 503-N.

The nonvolatile memory 506 stores data of a group setting screen which sets the plurality of consoles and server units as one group, data of a server selection screen, and setting information when the plurality of consoles and server units are set as one group. Further, the nonvolatile memory 506 includes table data in FIG. 4 which provides for a relationship between a log-in ID and a password used when the multi-user KVM switch 1 is logged in.

The network IF 507 is connected to a remote terminal 3 (e.g. a PC) via a network 2. The dip switch 508 is a setting means that is composed of hardware and sets the plurality of consoles as one group. The network IF 507 and the dip switch 508 are connected to the controlling MCU 505.

Figure 5:
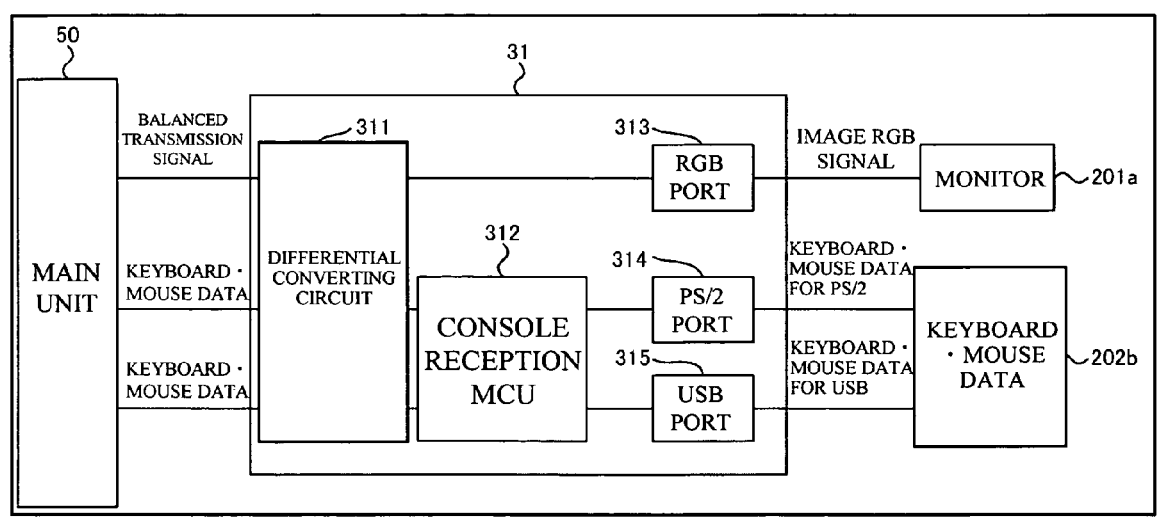
FIG. 5 is a block diagram showing the construction of a console unit 31.

FIG. 5 is a block diagram showing the construction of the console unit 31.

The console unit 31 includes a differential converting circuit 311, a console reception MCU (Micro Controller Unit) 312, an RGB port 313, a PS/2 port 314, and a USB port 315.

The differential converting circuit 311 converts the balanced transmission signal into the RGB signal, and outputs the RGB signal to the monitor 201a via the RGB port 313. The differential converting circuit 311 further receives operation data for the PS/2 port 314 or the USB port 315 from the keyboard or mouse 201b, converts the operation data into operation data of the keyboard or mouse, and outputs the converted operation data to the main unit 50.

The RGB port 313 is connected to the monitor 201a, and outputs the RGB signal converted with the differential converting circuit 311 to the monitor 201a. The console reception MCU 312 outputs the operation data of the keyboard or mouse to the differential converting circuit 311 via the PS/2 port 314 or the USB port 315. The console unit 31 further may include a COM port for connecting external equipment thereto. In addition, the USB port 315 can connect to USB equipment other than the keyboard or mouse. It should be noted that the construction of the other console units is the same as that of the console unit 31, and hence description thereof is omitted.

Figure 6:
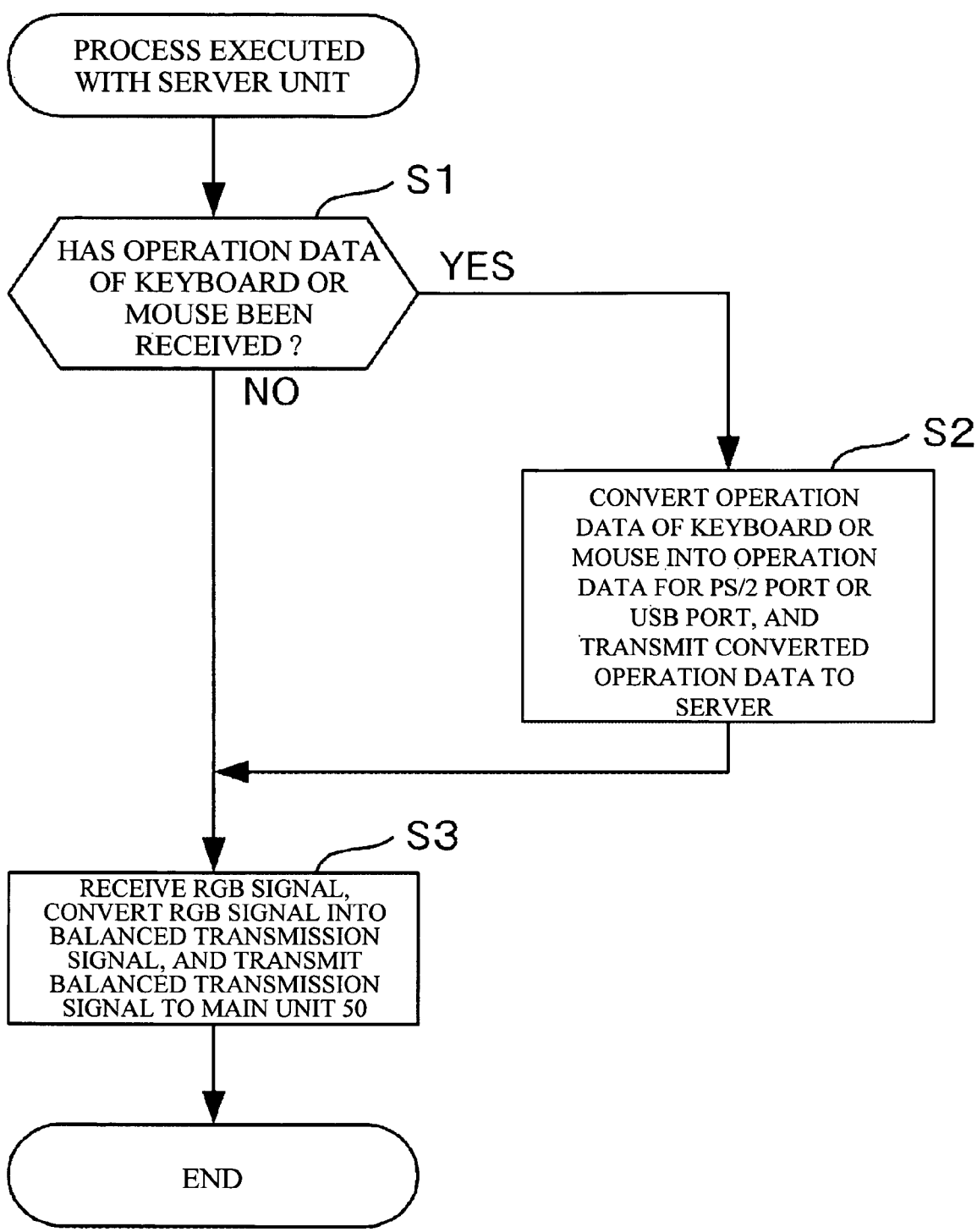
FIG. 6 is a flowchart showing a process executed with the server unit 11.

FIG. 6 is a flowchart showing a process executed with the server unit 11.

First, the console transmission MCU 124 determines whether the operation data of the keyboard or mouse has been received from the main unit 50 (step S1).

When the answer to the determination of step S1 is "YES", the console transmission MCU 124 converts the operation data of the keyboard or mouse received from the main unit 50 into the operation data for the PS/2 port or the USB port, and transmits the converted operation data to the server 101 via the PS/2 port 122 or the USB port 123 (step S2). The procedure proceeds to step S3.

When the answer to the determination of step S1 is "NO", the differential converting circuit 125 receives the RGB signal from the server via the RGB port 121, converts the RGB signal into the balanced transmission signal, and transmits the balanced transmission signal to the main unit 50 (step S3). The procedure is terminated.

Figure 7:
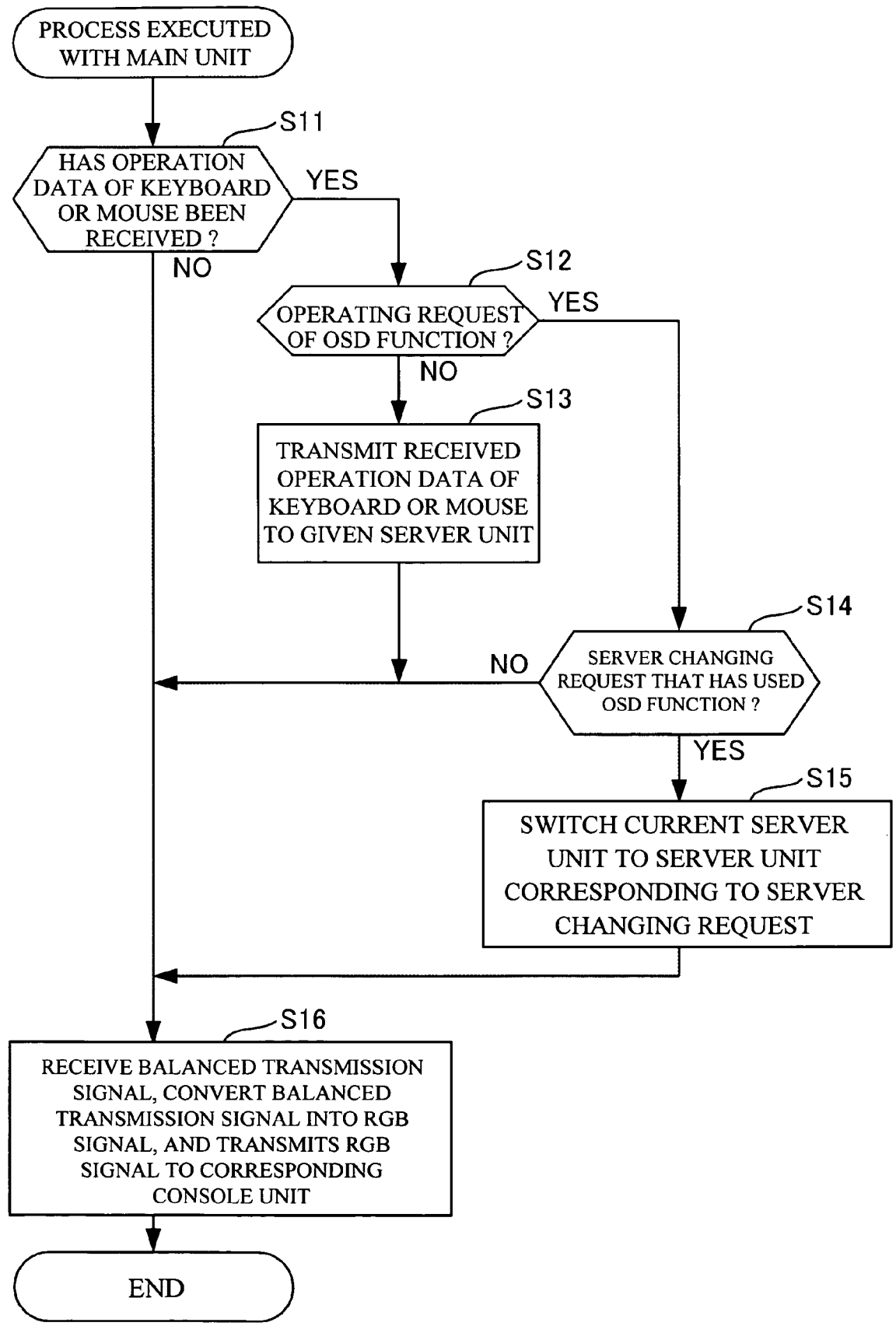
FIG. 7 is a flowchart showing a process executed with the main unit 50.

FIG. 7 is a flowchart showing a process executed with the main unit 50.

The controlling MCU 505 determines whether the differential converting circuit 504 has received the operation data of the keyboard or mouse from any one of the consoles (step S11).

When the answer to the determination of step S11 is "NO", the differential converting circuit 504 receives the balanced transmission signal from each server unit via the differential converting circuit 501 and the switching circuit 502, converts the balanced transmission signal into the RGB signal, and transmits the RGB signal to a corresponding console unit (step S16). The procedure is terminated.

When the answer to the determination of step S11 is "YES", the controlling MCU 505 determines whether the received operation data of the keyboard or mouse is an operating request of the OSD function (step S12).

When the answer to the determination of step S12 is "NO", the differential converting circuit 504 transmits the received operation data of the keyboard or mouse to a given server unit via the differential converting circuit 501 and the switching circuit 502 (step S13). The procedure proceeds to step S16.

When the answer to the determination of step S12 is "YES", the controlling MCU 505 determines whether the received operation data of the keyboard or mouse is a server changing request that has used the OSD function (step S14).

When the answer to the determination of step S14 is "NO", the procedure proceeds to step S16. On the other hand, when the answer to the determination of step S14 is "YES", the controlling MCU 505 notifies the switching circuit 502 of an instruction to switch to a server unit corresponding to the server changing request, and the switching circuit 502 switches a current server unit to a server unit corresponding to the server changing request (step S15). The procedure proceeds to step S16.

Figure 8:
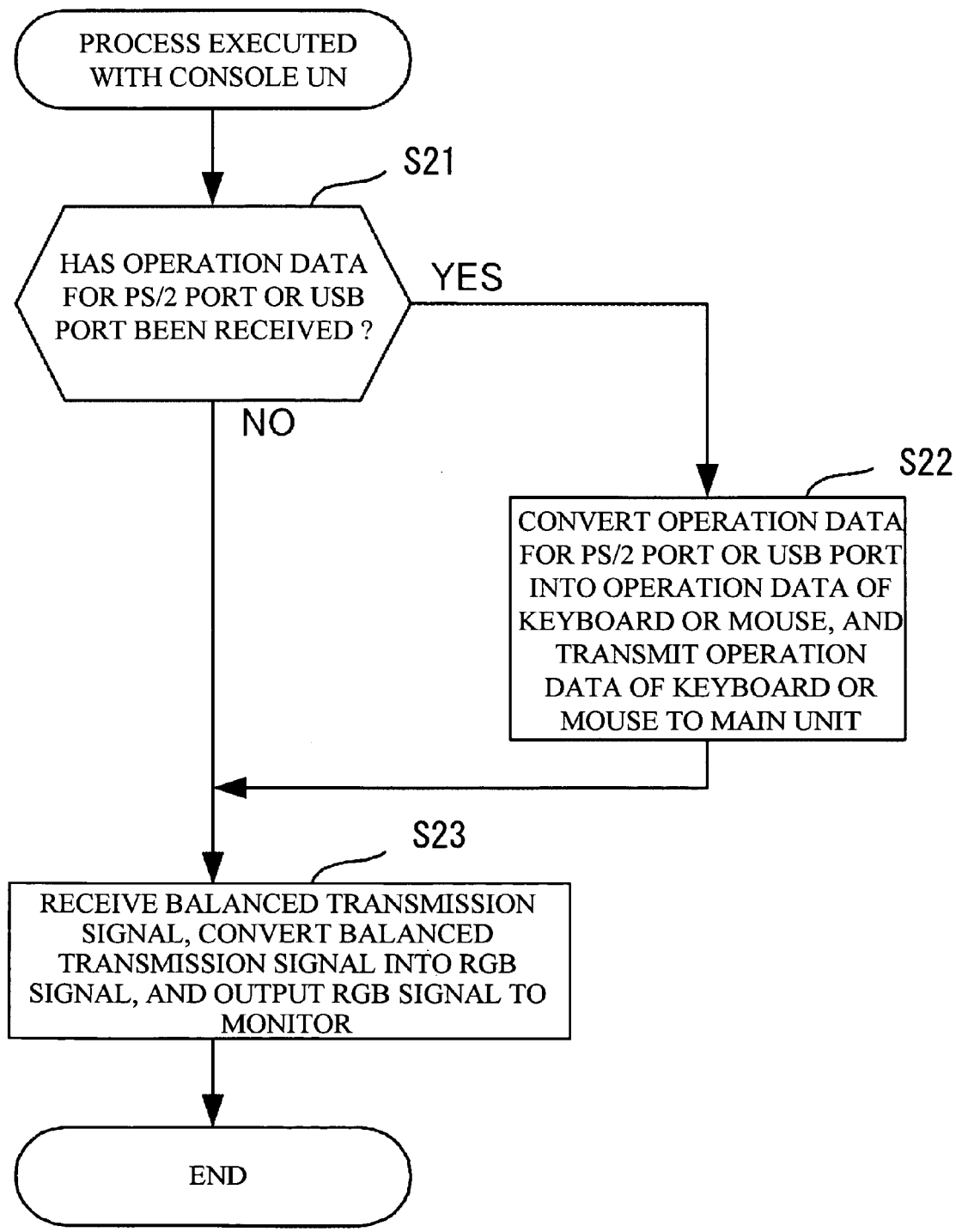
FIG. 8 is a flowchart showing a process executed with the console unit 31.

FIG. 8 is a flowchart showing a process executed with the console unit 31. It should be noted that the other console units also execute the same process as the process in FIG. 8.

First, the console reception MCU 312 determines whether the operation data for the PS/2 port or the USB port has been received from the keyboard or mouse 201*b* (step S21).

When the answer to the determination of step S21 is "YES", the differential converting circuit 311 converts the operation data for the PS/2 port or the USB port into the operation data of the keyboard or mouse, and transmits the operation data of the keyboard or mouse to the main unit 50 (step S22). The procedure proceeds to step S23.

When the answer to the determination of step S21 is "NO", the differential converting circuit 311 receives the balanced transmission signal, converts the balanced transmission signal into the RGB signal, and outputs the RGB signal to the monitor 201*a* via the RGB port 313 (step S23). The procedure is terminated.

There will now be described a process (a method) to realize the multi-monitor environment.

Figure 9:
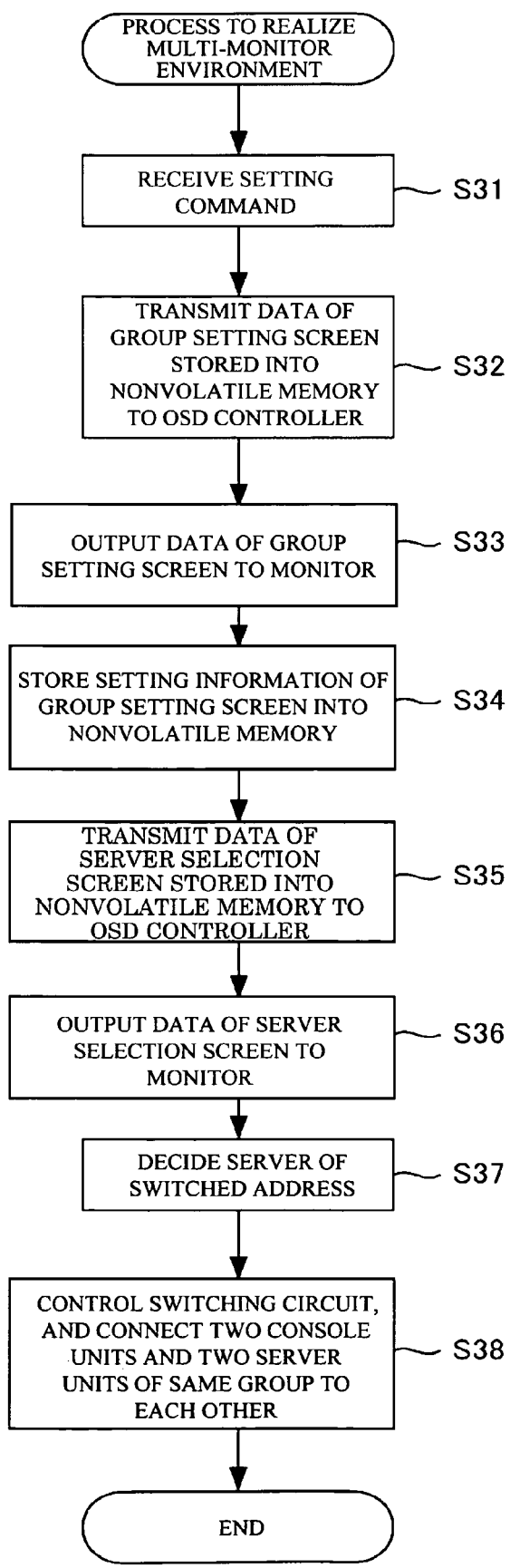
FIG. 9 is a flowchart showing a process to realize the multi-monitor environment.

FIG. 9 is a flowchart showing a process to realize the multi-monitor environment.

Figure 10:
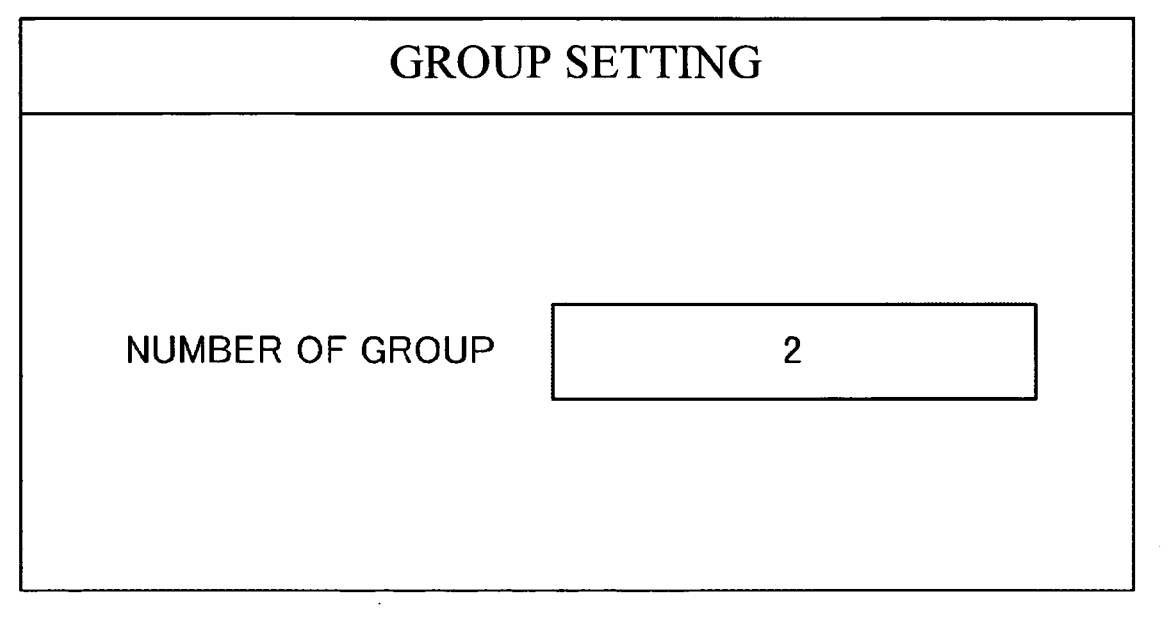

When the controlling MCU 505 receives a setting command to set the plurality of consoles and server units as one group from the console 201 via the console unit 31, for example (step S31), the controlling MCU 505 transmits data of the group setting screen stored into the nonvolatile memory 506 to the OSD controller 503-1 (step S32). The OSD controller 503-1 outputs the data of the group setting screen to the monitor 201*a* of the console 201 via the console unit 31 (step S33). FIG. 10 shows an example of the group setting screen displayed on the monitor 201*a*.

For example, by inputting "2" to the column of "NUMBER OF GROUP" of this group setting screen, and depressing an enter key, the console units and the server units are grouped every two sets. That is, two consoles are grouped for each server.

Thus, the number of sets of the console unit and the server unit to be grouped, i.e., the number of consoles grouped for each server can be set by inputting a desired value to the column of "NUMBER OF GROUP" of the group setting screen. Any value as the number of sets of the console unit and the server unit to be grouped, i.e., the number of consoles grouped for each server can be input to the column, and hence it is possible to construct various multi-monitor environments such as two screens, three screens, or four screens.

Setting information of the group setting screen input from the keyboard 201*b* (i.e., the number of sets of the console unit and the server unit to be grouped, or the number of consoles grouped for each server) is stored into the nonvolatile memory 506 in the controlling MCU 505 via the console unit 31 (step S34). Even if the power supply of the multi-user KVM switch 1 is turn off, the setting information is kept in the nonvolatile memory 506.

In the present embodiment, the consoles 31 to 46 are sequentially allocated to each server. Therefore, when the number of consoles grouped for each serve is two, the consoles 31 and 32 are allocated to the server 101, and the consoles 33 and 34 are allocated to the server 102. The information of consoles grouped for each serve (i.e., names, numbers and so on of the consoles (the monitor, the keyboard, and the mouse)) may be stored into the nonvolatile memory 506 as the setting information.

Next, the controlling MCU 505 transmits the data of the server selection screen stored into the nonvolatile memory 506 to the OSD controller 503-1 (step S35). The OSD controller 503-1 outputs the data of the server selection screen to the monitor 201*a* of the console 201 via the console unit 31 (step S36). FIG. 11 shows an example of the server selection screen displayed on the monitor 201*a*.

In the server selection screen, the server of the address switched by depressing a "↑" key or a "↓" key of the keyboard 201*b* can be selected, and the server of the switched address can be decided by depressing an enter ("ENT") key. In the server selection screen, it is possible to log out from the multi-user KVM switch 1 by depressing an "L" key, to close the server selection screen by depressing an "ESC" key, and to display a menu screen on the monitor 201*a* by depressing an "M" key.

For example, when the server 101 is selected and decided via the keyboard 201*b*, the controlling MCU 505 decides the server 101 as the server of the switched address (step S37). The controlling MCU 505 controls the switching circuit 502, and connects two console units (in this case, the console units 31 and 32) and two server units (in this case, the server units 11 and 12) of the same group to each other (step S38). Thus, two grouped server units (in this case, the server units 11 and 12) are connected to the server 101 at the same time, and the two console units (in this case, the console units 31 and 32) of the same group are connected to the two grouped server units. Therefore, the user can operate the server 101 in the multi-monitor environment of two screens of the monitor 201*a* and the monitor 202*a*.

Although the above description is directed to a setting example of the group setting screen and the server selection screen of the OSD function that the multi-user KVM switch 1 has, the remote terminal 3 may transmit a setting command to the controlling MCU 505 via the network 2 and the network IF 507. In this case, the data of the group setting screen and the data of the server selection screen are transmitted the remote terminal 3 via the network IF 507 and the network 2. Therefore, the user can execute the setting of the group and the selection of the server from the remote terminal 3.

When sub switches included in the dip switch 508 corresponding to each server unit and each console unit are set to "ON" or "OFF", the controlling MCU 505 groups the server unit and the console unit which are set to "ON".

When a touch panel is attached to the monitor, the touch panel is connected to the multi-user KVM switch 1 via the COM port or the USB port included in the console unit. In this case, the COM port or the USB port included in the console unit also be grouped. The switching circuit 502 switches the COM port or the USB port in switching the server.

Figure 12:
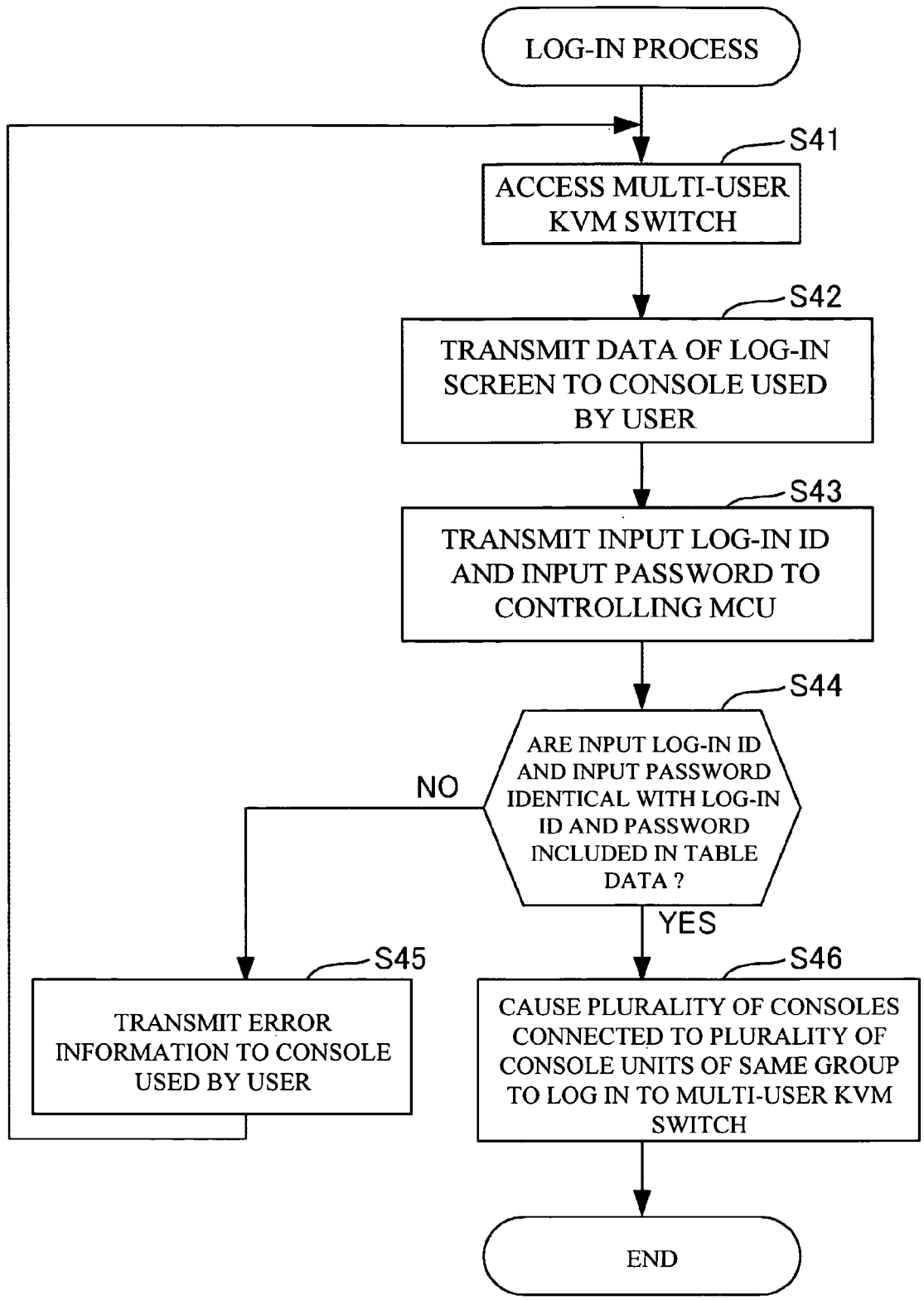
FIG. 12 is a flowchart showing a process to log in to the multi-user KVM switch 1 when a plurality of consoles are grouped for each server.

FIG. 12 is a flowchart showing a process to log in to the multi-user KVM switch 1 when the plurality of consoles are grouped for each server.

Figure 13:
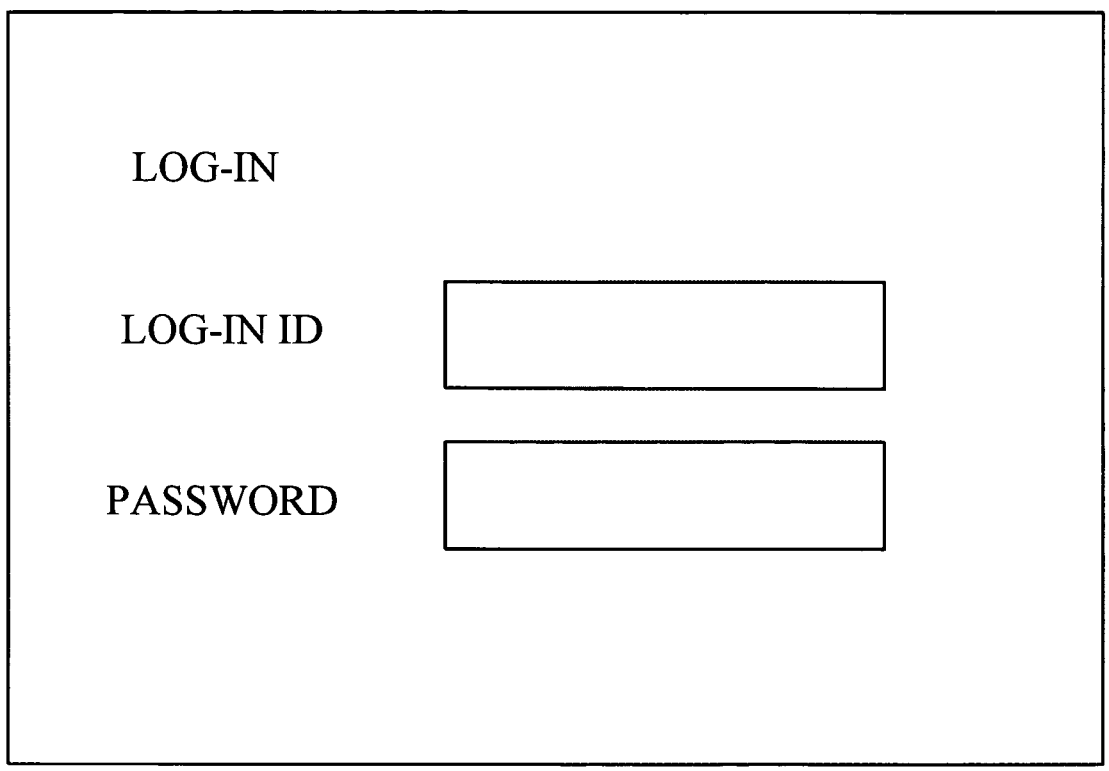
FIG. 13 is a diagram showing an example of a log-in screen.

First, when the user accesses the multi-user KVM switch 1 from the mouse or keyboard of any grouped console (step S41), the controlling MCU 505 transmits data of a log-in screen stored into the nonvolatile memory 506 to the console used by the user via the OSD controllers 503-N (step S42). The log-in screen as shown in FIG. 13 is displayed on the monitor of the console used by the user.

When the user inputs a log-in ID and a password peculiar to the user to the columns of the log-in ID and the password of the log-in screen via the keyboard, respectively, the log-in ID and the password are transmitted to the controlling MCU 505 of the main unit 50 via the console unit (step S43).

The controlling MCU 505 determines whether the input log-in ID and the input password are identical with the log-in ID and the password included in the table data in FIG. 4 stored into the nonvolatile memory 506 (step S44).

When the input log-in ID and the input password are not identical with the log-in ID and the password included in the table data in FIG. 4 stored into the nonvolatile memory 506 (NO in step S44), the controlling MCU 505 transmits error information to the console used by the user via the OSD controllers 503-N (step S45). The procedure returns to step S41. Therefore, the error information is displayed on the monitor of the console used by the user.

When the input log-in ID and the input password are identical with the log-in ID and the password included in the table data in FIG. 4 stored into the nonvolatile memory 506 (YES in step S44), the controlling MCU 505 controls the switching circuit 502, and connects the plurality of grouped console units and grouped server units to each other, i.e., causes the plurality of consoles of the same group to log in to the multi-user KVM switch 1 (step S46). The procedure is terminated.

According to the present process, by executing the log-in process with one grouped console, log-in process from the other consoles of the same group can be omitted.

Figure 14:
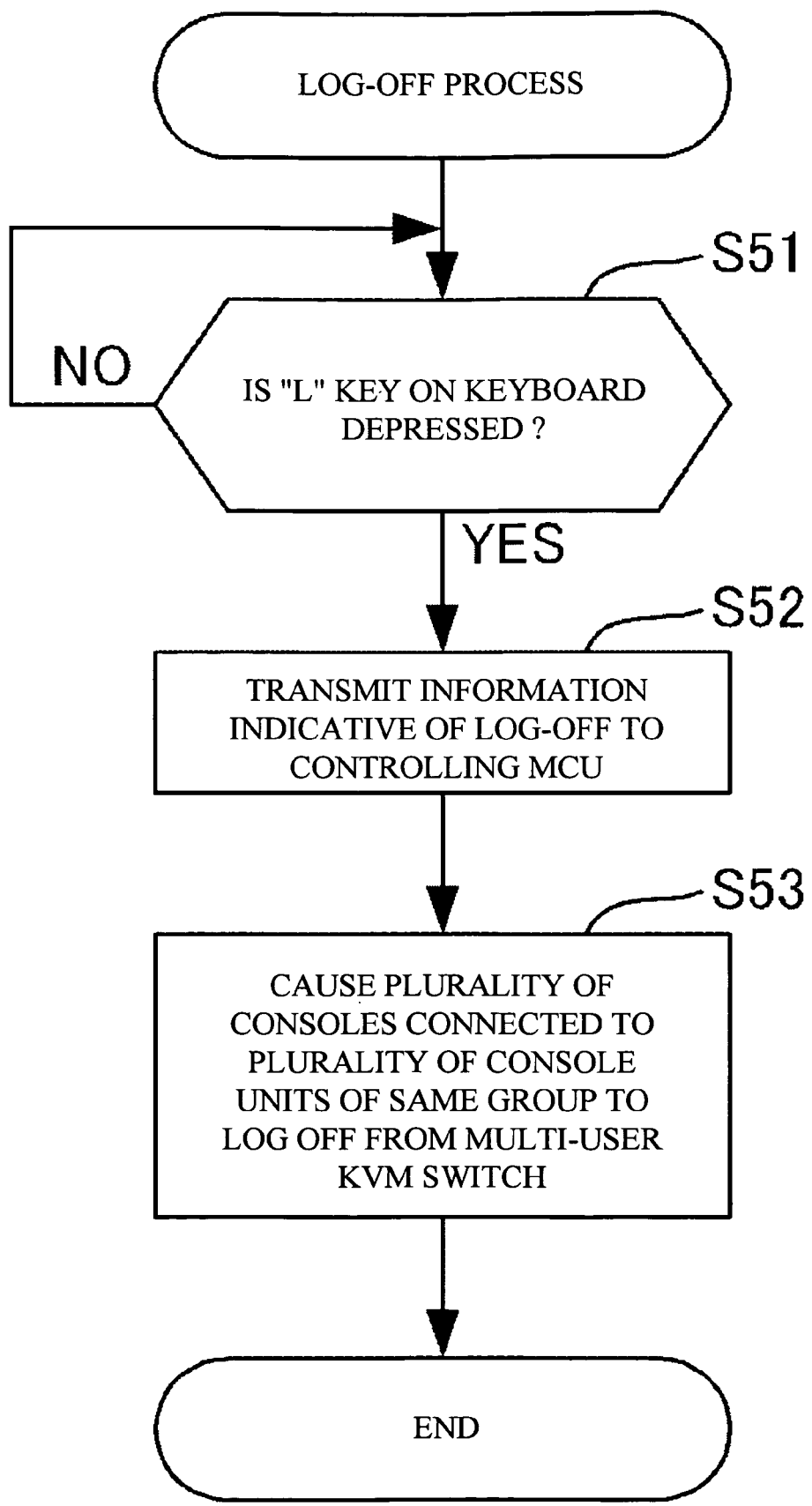
FIG. 14 is a flowchart showing a process to log off from the multi-user KVM switch 1 when the plurality of consoles are grouped for each server.

FIG. 14 is a flowchart showing a process to log off from the multi-user KVM switch 1 when the plurality of consoles are grouped for each server.

When the server selection screen in FIG. 11 is displayed on the monitor of the grouped console, and the "L" key on the keyboard of the grouped console is depressed (YES in step S51), information indicative of the log-off is transmitted to the controlling MCU 505 of the main unit 50 via the console unit (step S52). The controlling MCU 505 causes the plurality of grouped consoles to log off from the multi-user KVM switch 1 (step S53). The procedure is terminated.

After the log-off, the controlling MCU 505 may transmit the data of the log-in screen stored into the nonvolatile memory 506 to the console used by the user via the OSD controllers 503-N. As a result, the log-in screen as shown in FIG. 13 is displayed on the monitor of the console used by the user.

According to the present process, by executing the log-off process with one grouped console, log-off process from the other consoles of the same group can be omitted.

As described in detail above, according to the embodiment of the present invention, the multi-user KVM switch 1 is connected between the plurality of consoles including the monitors, and the plurality of servers, and has the controlling MCU 505 that sets a part or all of the plurality of consoles to each server as one group. The plurality of monitors included in the plurality of consoles which are set as one group by the controlling MCU 505 display information from a server corresponding to the group. Therefore, it is possible to provide the KVM switch which is adaptable to the multi-monitor environment.

The controlling MCU 505 decides a server outputting information displayed on the plurality of monitors, and the switching circuit 502 switches a server corresponding to a current group to the server decided by the controlling MCU 505. Therefore, it is possible to switch the server corresponding to the current group to the server outputting information displayed on the plurality of monitors.

The multi-user KVM switch 1 includes the network IF 507 that can be communicated with the remote terminal 3, and the setting of the group by the controlling MCU 505 is executable from the remote terminal 3 via the network IF 507. Therefore, it is possible to set the plurality of consoles to each server as one group from the remote terminal.

Further, the multi-user KVM switch 1 can set the plurality of monitors to each server as one group by using the dip switch 508 installed in the housing of the main unit 50.

In addition, when any one of the plurality of consoles set as one group logs in to the multi-user KVM switch 1, the controlling MCU 505 causes the other consoles of the same group to log in to the multi-user KVM switch 1. Therefore, it is possible to reduce an operating burden on the user in logging in to the multi-user KVM switch 1.

When any one of the plurality of consoles set as one group logs off from the multi-user KVM switch 1, the controlling MCU 505 causes the other consoles of the same group to log off from the multi-user KVM switch 1. Therefore, it is possible to reduce an operating burden on the user in logging off from the multi-user KVM switch 1.

It should be noted that the present invention is not limited to those embodiments, and various modifications may be made to them without departing from the scope of the invention.

Finally, several aspects of the present invention are summarized below.

According to a first aspect of the present invention, there is provided a KVM switch connected between a plurality of consoles including a plurality of monitors, and a plurality of information processing apparatuses, comprising: a setting portion that sets a part or all of the plurality of consoles to each information processing apparatus as one group; wherein the plurality of monitors included in the plurality of consoles which are set as one group by the setting portion display information from an information processing apparatus corresponding to the group.

With the above arrangement, it is possible to provide a KVM switch which is adaptable to a multi-monitor environment.

Preferably, the KVM switch further comprises a deciding portion that decides an information processing apparatus outputting information displayed on the plurality of monitors, and a switching portion that switches an information processing apparatus corresponding to a current group to the information processing apparatus decided by the deciding portion.

With the above arrangement, it is possible to switch the information processing apparatus corresponding to the current group to the server outputting information displayed on the plurality of monitors.

Preferably, the KVM switch further comprises a communicating portion capable of communicating with an external terminal, wherein the setting of the group by the setting portion is executable from the external terminal via the communicating portion.

With the above arrangement, it is possible to set the plurality of consoles to each information processing apparatus as one group from the external terminal.

Preferably, the setting portion includes an operating element installed in a housing of the KVM switch.

With the above arrangement, it is possible to set the plurality of monitors to each information processing apparatus as one group by using the operating element installed in the housing of the KVM switch.

Preferably, the KVM switch further comprises a nonvolatile memory that stores information relating to the plurality of consoles which are set as one group by the setting portion.

With the above arrangement, even if a power supply of the KVM switch is turn off, the information relating to the plurality of consoles which are set as one group can be kept in the nonvolatile memory.

More preferably, the KVM switch further comprises a plurality of COM ports or USB ports that connects peripheral devices thereto, wherein the setting portion switches the plurality of COM ports or USB ports.

With the above arrangement, it is possible to switch the plurality of COM ports or USB ports that connects the peripheral devices thereto.

Preferably, the KVM switch further comprises a controlling portion that, when any one of the plurality of consoles set as the one group logs in to the KVM switch, causes the other consoles of the same group to log in to the KVM switch.

With the above arrangement, it is possible to reduce an operating burden on a user in logging in to the KVM switch.

More preferably, when any one of the plurality of consoles set as the one group logs off from the KVM switch, the controlling portion causes the other consoles of the same group to log off from the KVM switch.

With the above arrangement, it is possible to reduce an operating burden on a user in logging off from the KVM switch.

Preferably, the KVM switch further comprises a controlling portion that, when any one of the plurality of consoles set as the one group logs off from the KVM switch, causes the other consoles of the same group to log off from the KVM switch.

With the above arrangement, it is possible to reduce an operating burden on a user in logging off from the KVM switch.

More preferably, the KVM switch further comprises a controlling portion that, when any one of the plurality of consoles set as the one group logs in to the KVM switch, causes the other consoles of the same group to log in to the KVM switch.

With the above arrangement, it is possible to reduce an operating burden on a user in logging in to the KVM switch.

According to a second aspect of the present invention, there is provided a method for controlling a KVM switch connected between a plurality of consoles including a plurality of monitors, and a plurality of information processing apparatuses, comprising: a setting step that sets a part or all of the plurality of consoles to each information processing apparatus as one group; wherein the plurality of monitors included in the plurality of consoles which are set as one group in the setting step display information from an information processing apparatus corresponding to the group.

With the above arrangement, it is possible to provide a method for controlling a KVM switch which is adaptable to a multi-monitor environment.

Preferably, the method for controlling the KVM switch further comprises a deciding step that decides an information processing apparatus outputting information displayed on the plurality of monitors, and a switching step that switches an information processing apparatus corresponding to a current group to the information processing apparatus decided in the deciding step.

With the above arrangement, it is possible to switch the information processing apparatus corresponding to the current group to the server outputting information displayed on the plurality of monitors.

Preferably, the method for controlling the KVM switch further comprises a communicating step capable of communicating with an external terminal, wherein the setting of the group in the setting step is executable from the external terminal via the communicating step.

With the above arrangement, it is possible to set the plurality of consoles to each information processing apparatus as one group from the external terminal.

Preferably, the method for controlling the KVM switch further comprises a controlling step that, when any one of the plurality of consoles set as the one group logs in to the KVM switch, causes the other consoles of the same group to log in to the KVM switch.

With the above arrangement, it is possible to reduce an operating burden on a user in logging in to the KVM switch.

More preferably, when any one of the plurality of consoles set as the one group logs off from the KVM switch, the controlling step causes the other consoles of the same group to log off from the KVM switch.

With the above arrangement, it is possible to reduce an operating burden on a user in logging off from the KVM switch.

Preferably, the method for controlling the KVM switch further comprises a controlling step that, when any one of the plurality of consoles set as the one group logs off from the KVM switch, causes the other consoles of the same group to log off from the KVM switch.

With the above arrangement, it is possible to reduce an operating burden on a user in logging off from the KVM switch.

More preferably, the method for controlling the KVM switch further comprises a controlling step that, when any one of the plurality of consoles set as the one group logs in to the KVM switch, causes the other consoles of the same group to log in to the KVM switch.

With the above arrangement, it is possible to reduce an operating burden on a user in logging in to the KVM switch.

The present application is based on Japanese Patent Application No. 2007-229586 filed Sep. 4, 2007, the entire disclosure of which is hereby incorporated by reference.

What is claimed is:

1. A KVM switch connected between a plurality of consoles including a plurality of monitors, and a plurality of information processing apparatuses, comprising:
   data for displaying a group setting screen; and
   a setting portion that sets at least two of the plurality of consoles to each of the plurality of information processing apparatuses as one group, a number of the at least two of the plurality of consoles to be set as the one group being identical with a value equal to or more than two inputted into the group setting screen, and the at least two of the plurality of consoles being sequentially allocated in accordance with the number to each of the plurality of information processing apparatuses,
   wherein the plurality of monitors included in the plurality of consoles which are set as the one group by the setting portion displays information from one of the information processing apparatuses corresponding to the one group.

2. The KVM switch as claimed in claim 1, further comprising a deciding portion that decides an information processing apparatus outputting information displayed on the plurality of monitors, and a switching portion that switches an information processing apparatus corresponding to a current group to the information processing apparatus decided by the deciding portion.

3. The KVM switch as claimed in claim 1, further comprising a communicating portion capable of communicating with an external terminal, wherein the setting of the one group by the setting portion is executable from the external terminal via the communicating portion.

4. The KVM switch as claimed in claim 1, wherein the setting portion includes an operating element installed in a housing of the KVM switch.

5. The KVM switch as claimed in claim 1, further comprising a nonvolatile memory that stores information relating to the plurality of consoles which are set as the one group by the setting portion.

6. The KVM switch as claimed in claim 2, further comprising a plurality of COM ports or USB ports that connects peripheral devices thereto, wherein the setting portion switches the plurality of COM ports or USB ports.

7. The KVM switch as claimed in claim 1, further comprising a controlling portion that, when any one of the plurality of consoles set as the one group logs in to the KVM switch, causes the other consoles of the same one group to log in to the KVM switch.

8. The KVM switch as claimed in claim 7, wherein when any one of the plurality of consoles set as the one group logs off from the KVM switch, the controlling portion causes the other consoles of the same one group to log off from the KVM switch.

9. The KVM switch as claimed in claim 1, further comprising a controlling portion that, when any one of the plurality of consoles set as the one group logs off from the KVM switch, causes the other consoles of the same one group to log off from the KVM switch.

10. The KVM switch as claimed in claim 2, further comprising a controlling portion that, when any one of the plurality of consoles set as the one group logs in to the KVM switch, causes the other consoles of the same one group to log in to the KVM switch.

11. A method for controlling a KVM switch connected between a plurality of consoles including a plurality of monitors, and a plurality of information processing apparatuses, the KVM switch including data for displaying a group setting screen, comprising:
    a displaying step that displays a group setting screen; and
    a setting step that sets at least two of the plurality of consoles to each of the plurality of information processing apparatuses as one group, a number of the at least two of the plurality of consoles to be set as the one group being identical with a value equal to or more than two inputted into the group setting screen, and the at least two of the plurality of consoles being sequentially allocated in accordance with the number to each of the plurality of information processing apparatuses,
    wherein the plurality of monitors included in the plurality of consoles which are set as the one group in the setting step displays information from anone of the information processing apparatuses corresponding to the one group.

12. The method for controlling the KVM switch as claimed in claim 11, further comprising a deciding step that decides an information processing apparatus outputting information displayed on the plurality of monitors, and a switching step that switches an information processing apparatus corresponding to a current group to the information processing apparatus decided in the deciding step.

13. The method for controlling the KVM switch as claimed in claim 11, further comprising a communicating step capable of communicating with an external terminal, wherein the setting of the one group in the setting step is executable from the external terminal via the communicating step.

14. The method for controlling the KVM switch as claimed in claim 11, further comprising a controlling step that, when any one of the plurality of consoles set as the one group logs in to the KVM switch, causes the other consoles of the same one group to log in to the KVM switch.

15. The method for controlling the KVM switch as claimed in claim 14, wherein when any one of the plurality of consoles set as the one group logs off from the KVM switch, the controlling step causes the other consoles of the same one group to log off from the KVM switch.

16. The method for controlling the KVM switch as claimed in claim 11, further comprising a controlling step that, when any one of the plurality of consoles set as the one group logs off from the KVM switch, causes the other consoles of the same one group to log off from the KVM switch.

17. The method for controlling the KVM switch as claimed in claim 12, further comprising a controlling step that, when any one of the plurality of consoles set as the one group logs in to the KVM switch, causes the other consoles of the same one group to log in to the KVM switch.

* * * * *

UNITED STATES PATENT AND TRADEMARK OFFICE
CERTIFICATE OF CORRECTION

PATENT NO. : 8,386,673 B2  
APPLICATION NO. : 12/230698  
DATED : February 26, 2013  
INVENTOR(S) : Masanobu Hayama Page 1 of 1

It is certified that error appears in the above-identified patent and that said Letters Patent is hereby corrected as shown below:

Title Page Col. 2 (Foreign Patent Documents); Line 10, Delete "03/04244" and insert -- 03/042844 --, therefor.

In the Claims:

Column 12, Line 31, In Claim 11, delete "anone" and insert -- one --, therefor.

Signed and Sealed this  
Fourteenth Day of May, 2013

Teresa Stanek Rea  
*Acting Director of the United States Patent and Trademark Office*